(12) United States Patent
Lyons et al.

(10) Patent No.: US 11,016,476 B2
(45) Date of Patent: *May 25, 2021

(54) MONITORING AND REPORTING OF INDUSTRIAL EQUIPMENT STATUS

(71) Applicant: Baker Hughes, a GE Company, LLC, Houston, TX (US)

(72) Inventors: Christopher James Lyons, Oakland, CA (US); David Clayton Bingham, San Ramon, CA (US); Waqas Javed, San Leandro, CA (US); Ricardo Lucas Bastos Breder, Walnut Creek, CA (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 106 days.

This patent is subject to a terminal disclaimer.

(21) Appl. No.: 16/274,707

(22) Filed: Feb. 13, 2019

(65) Prior Publication Data
US 2019/0332100 A1 Oct. 31, 2019

Related U.S. Application Data

(63) Continuation of application No. 15/002,042, filed on Jan. 20, 2016, now Pat. No. 10,209,706.

(51) Int. Cl.
*G05B 23/02* (2006.01)
*H04W 4/80* (2018.01)

(52) U.S. Cl.
CPC ..... *G05B 23/0224* (2013.01); *G05B 23/0272* (2013.01); *H04W 4/80* (2018.02)

(58) Field of Classification Search
None
See application file for complete search history.

(56) References Cited

U.S. PATENT DOCUMENTS 10,209,706 B2 * 2/2019 Lyons ................ G05B 23/0272

* cited by examiner

*Primary Examiner* — Michael Lebentritt
(74) *Attorney, Agent, or Firm* — Mintz Levin Cohn Ferris Glovsky and Popeo, PC; Lisa Adams

(57) ABSTRACT

A system includes one or more sensors coupled to industrial equipment, wherein the one or more sensors are configured to obtain one or more measurements associated with one or more operating characteristics of the industrial equipment. The system also includes a computing device that includes a user interface and one or more processors. The one or more processors are configured to: receive the one or more measurements of the one or more operating characteristics of the industrial equipment; determine a status of the industrial equipment based on the one or more measurements; determine a date and a time based on the one or more measurements; and update a cell in a grid of cells organized according to time increments based on the status, the date, and the time.

20 Claims, 5 Drawing Sheets

MONITORING AND REPORTING OF INDUSTRIAL EQUIPMENT STATUS

CROSS-REFERENCE TO RELATED APPLICATION

This application is a continuation of U.S. patent application Ser. No. 15/002,042 entitled "MONITORING AND REPORTING OF INDUSTRIAL EQUIPMENT STATUS," filed Jan. 20, 2016, which is hereby incorporated herein by reference in its entirety.

BACKGROUND

The subject matter disclosed herein relates to monitoring and reporting data related to a status of industrial equipment.

The industrial equipment, which may include a gas turbine, wind turbine, gas engine, diesel engine, reciprocating engine, etc., may be complex, be composed of many mechanical and electrical parts and systems, and perform jobs where interruption of the performance may be undesirable. In order for the industrial equipment to maintain reliable performance, it would be beneficial to monitor and accurately report the status of the industrial equipment in real-time or near real-time.

SUMMARY

Certain embodiments commensurate in scope with the original claims are summarized below. These embodiments are not intended to limit the scope of the claims, but rather these embodiments are intended only to provide a brief summary of possible forms of the disclosed embodiments. Indeed, the claims may encompass a variety of forms that may be similar to or different from the embodiments set forth below.

In a first embodiment, a system includes one or more sensors coupled to industrial equipment, wherein the one or more sensors are configured to obtain one or more measurements associated with one or more operating characteristics of the industrial equipment. The system also includes a computing device that includes a user interface and one or more processors. The one or more processors are configured to: receive the one or more measurements of the one or more operating characteristics of the industrial equipment; determine a status of the industrial equipment based on the one or more measurements; determine a date and a time based on the one or more measurements; and update a cell in a grid of cells organized according to time increments based on the status, the date, and the time.

In a second embodiment, a method includes using one or more processors of a computing device to receive operational information from a sensor coupled to industrial equipment. The method also includes using the one or more processors to determine a defined status of the industrial equipment based on the operational information. The method further includes using the one or more processors to determine a date and a time corresponding to when the sensor obtained the operational information. The method also includes using the one or more processors to update a cell in a grid of cells organized according to time increments based on the defined status, the time, and the date. The cell includes a visual indicator indicating the defined status of the industrial equipment. The cell also includes a dialog box that is visible based on user interaction. The dialog box includes the date corresponding to when the sensor obtained the operational information. The dialog box also includes the time corresponding to when the sensor obtained the operational information. The dialog box further includes the defined status of the industrial equipment.

In a third embodiment, a tangible, non-transitory, machine-readable-medium that includes machine-readable instructions to receive sensor information of an operational characteristic of industrial equipment. The tangible, non-transitory, machine-readable-medium also includes machine-readable instructions to determine a status of the industrial equipment based on the sensor information. The tangible, non-transitory, machine-readable-medium further includes machine-readable instructions to determine date-time information corresponding to when the sensor information was obtained. The tangible, non-transitory, machine-readable-medium also includes machine-readable instructions to update a cell in a grid of cells organized according to time increments based on the status and the date-time information. The grid includes cell positions that indicate a date and a time associated with each cell position. The cell includes a visual indicator indicating the status of the industrial equipment. The cell also includes a dialog box that is visible when a user positions a mouse pointer over or selects the cell. The dialog box includes a date field displaying a date based on the date-time information. The dialog box also includes a time field displaying a time based on the date-time information. The dialog box further includes a status field based on the status of the industrial equipment.

BRIEF DESCRIPTION OF THE DRAWINGS

These and other features, aspects, and advantages of the disclosed embodiments will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements.

The disclosed embodiments relate to systems and methods that enable a user to monitor a real-time or near real-time status of industrial equipment. The industrial equipment may include any equipment used in an industrial capacity in which real-time or near real-time monitoring may be beneficial, such as a gas turbine, a wind turbine, a gas engine, a diesel engine, a reciprocating engine, a compressor, etc. The industrial equipment may be complex, be composed of many mechanical and electrical parts and systems, and perform jobs where interruption of the performance may be inefficient for production or undesirable. In order for the industrial equipment to maintain its performance, it would be beneficial to monitor and accurately report the status of the industrial equipment in real-time or near real-time. Accordingly, systems and methods are presented for populating a grid of cells with entries that include one or more statuses of the industrial equipment for a number of time increments of operation. The grid may enable a user and/or software to change the status of the industrial equipment by accessing one or more entries of the grid. When shared among multiple users, embodiments of the present disclosure may achieve real-time or near-real time monitoring by enabling the multiple users to each report the status of the industrial equipment for a large number of time increments of operation as the status becomes known. Similarly, when integrating the grid with software, such as scheduling software where schedule of the industrial equipment may be entered by one or more users, embodiments of the present disclosure may achieve an even higher degree of accuracy.

Figure 1:
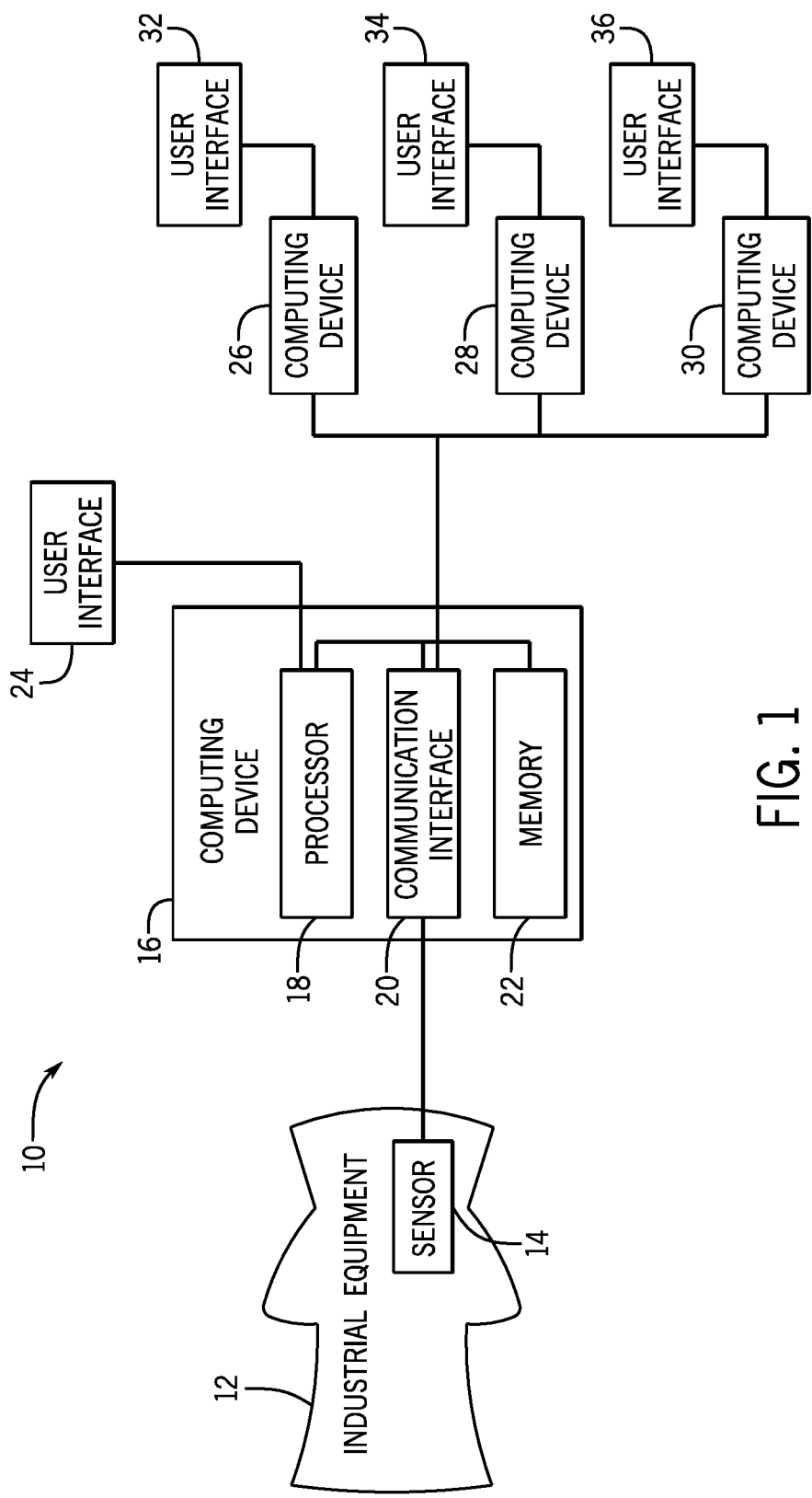
FIG. 1 is a schematic diagram of a system for monitoring and reporting a status of industrial equipment in accordance with an embodiment of the present disclosure.

Turning now to FIG. 1, a schematic diagram of a system 10 for monitoring and reporting a status of industrial equipment 12 in accordance with an embodiment of the present disclosure is illustrated. The system 10 includes the industrial equipment 12, such as a gas turbine (as illustrated). One or more sensors 14 may be coupled to the industrial equipment 12 to measure one or more operating characteristics of the industrial equipment 12. It should be understood that further references to the sensor 14 may refer to one or more sensors coupled to the industrial equipment 12. The sensor 14 may be any suitable sensor that may include circuitry to measure various properties related to the industrial equipment 12. For example, the sensor 14 may include an accelerometer, a proximity sensor, a tachometer, a temperature gauge, or a pressure gauge.

Moreover, the sensor 14 may measure certain operating characteristics of the industrial equipment 12. It should be understood that further references to the operating characteristic of the industrial equipment 12 may refer to one or more operating characteristics. For example, the operating characteristic of the industrial equipment 12 measured by the sensor 14 may include a speed, vibration, temperature, pressure, composition, mode of operation, and/or the like of the industrial equipment 12. The sensor 14 may be coupled to a computing device 16 and send one or more measurements of the operating characteristic of the industrial equipment 12 to the computing device 16 via wired or wireless communication components.

The computing device 16 may be a server, a personal computer, a laptop, an enterprise computing device, or any other suitable processor-based computing system. In particular, the computing device 16 may include a processor 18, a communication interface 20, and a memory 22. The sensor 14 may be coupled to the communication interface 20 of the computing device 16. In some embodiments, the sensor 14 may be physically coupled to the communication interface 20 by a cable, connector, or other physical coupling device, and communicate with the computing device 16 via a physical communication protocol. In some embodiments, the sensor 14 may be wirelessly coupled to the communication interface 20 by WiFi, wireless LAN, Internet, any proprietary wireless connection (e.g., BLUETOOTH), etc., and communicate with the computing device 16 via a wireless communication protocol.

The processor 18 of the computing device 16 may be coupled to the communication interface 20 and may include any general purpose or application-specific processor. The processor 18 may include one or more processors coupled together. It should be understood that further references to the processor 18 may refer to one or more processors of the computing device 16. The processor 18 may be configured to analyze the measurement of the operating characteristic of the industrial equipment 12 and process the measurement for display. For example, the processor 18 may associate a date and time with the measurement. The processor 18 may associate the status of the industrial equipment with the measurement. The status may be one of a set of defined statuses that indicate whether the industrial equipment 12 is operating as desired and, if the industrial equipment 12 is not operating as desired, whether a reason that the industrial equipment 12 is not operating as desired is known. For example, a status may be a defined status of "running (no issues)" that may indicate that the industrial equipment 12 is operating as programmed or desired. A status may be a defined status of "not-running, status accounted" that may indicate that the industrial equipment 12 is not operating as desired (e.g., the industrial equipment 12 is operating inefficiently, has halted, etc.), and the reason that the industrial equipment 12 is not operating as desired is known or accounted for. A status of "not-running, status unaccounted" may indicate that the industrial equipment 12 is not operating as desired, and the reason that the industrial equipment 12 is not operating as desired is unknown or unaccounted for.

The memory 22 of the computing device 16 may be coupled to the processor 18 and include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by a processor (e.g., the processor 18) or by any general purpose or special purpose computer or other machine with a processor (e.g., the processor 18). In some embodiments, the memory 22 may include a database or other memory that is coupled to the computing device 16, but not a component of the computing device 16. For example, the memory 22 may include the database that is wirelessly coupled to the communication interface 20 of the computing device 16 by WiFi, wireless LAN, Internet, any proprietary wireless connection (e.g., BLUETOOTH), etc. The memory 22 may store information related to the status of the industrial equipment and the operating characteristic of the industrial equipment (i.e., operational information). In some embodiments, the processor 18 may be configured to retrieve the status of the industrial equipment from the memory 22 based at least in part on the measurement of the operating characteristic of the industrial equipment 12. The processor 18 may also be coupled to a user interface 24. In some embodiments, the user interface may be a component of the computing device 16. The processor 18 may use the user interface 24 to display information based at least in part on the measurement of the operating characteristic of the industrial equipment 12. In this manner, a user may view and make decisions based on the information.

The communication interface 20 of the computing device 16 may also couple the computing device 16 to one or more other computing devices 26, 28, 30. The other computing devices may each be coupled to or include a user interface 32, 34, 36. In some embodiments, the communication interface 20 may be physically coupled to the one or more other computing devices 26, 28, 30 by a cable, connector, or other physical coupling device. In some embodiments, the communication interface 20 may be wirelessly coupled to the one or more other computing devices 26, 28, 30 by WiFi, wireless LAN, Internet, any proprietary wireless connection (e.g., BLUETOOTH), etc. In this manner, a user may view the information and make decisions based at least in part on the measurement of the operating characteristic of the industrial equipment 12 by using the computing device 26, 28, 30 that may not directly coupled to the industrial equipment 12, may be remotely coupled to the industrial equipment 12, and/or may be a personal computing device and/or a mobile device of the user.

Figure 2:
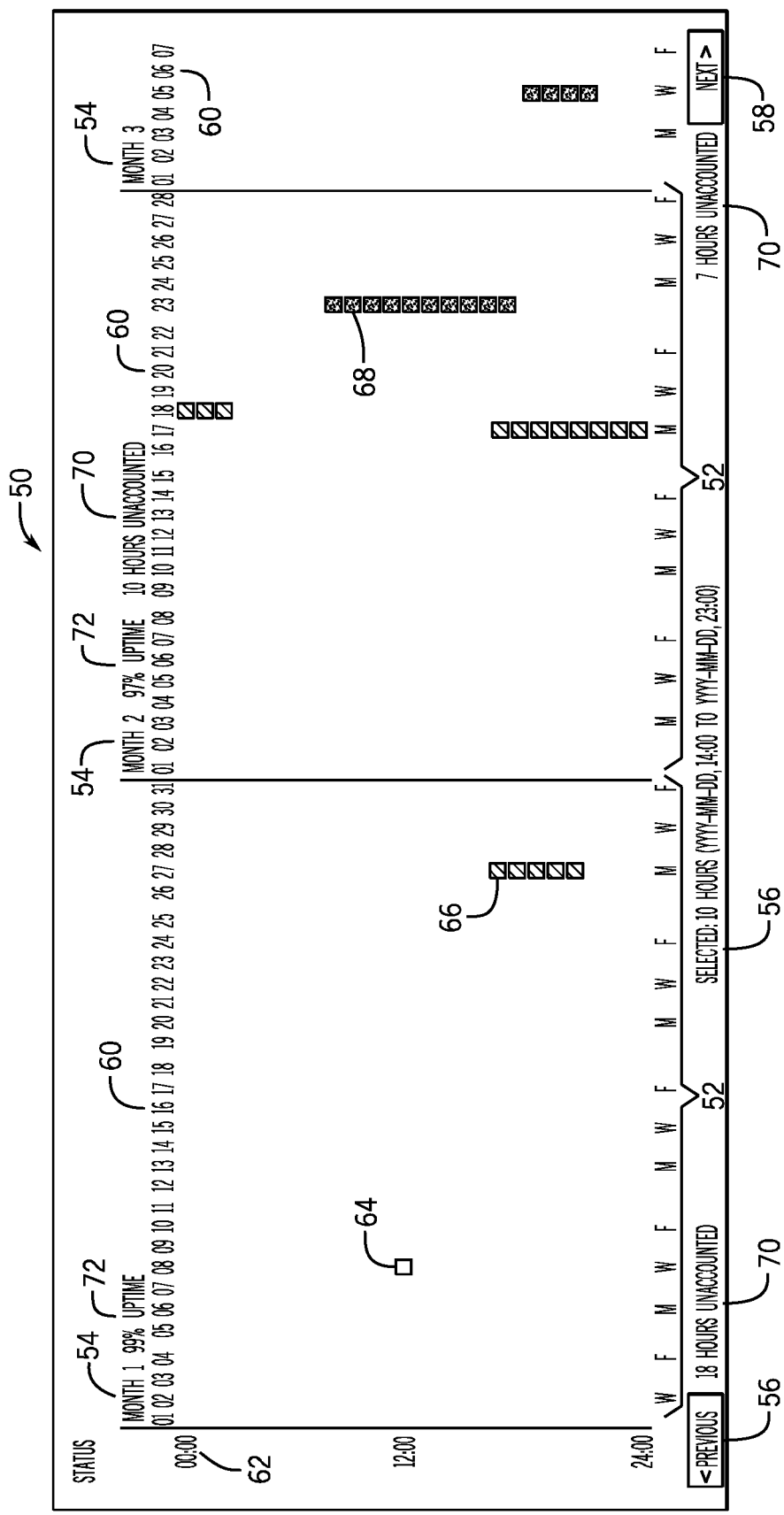
FIG. 2 is a sample screen of a system for monitoring and reporting a status of industrial equipment in accordance with an embodiment of the present disclosure.

With the foregoing in mind, FIG. 2 is a sample screen 50 of the system 10 for monitoring and reporting the status of the industrial equipment 12 in accordance with an embodiment of the present disclosure. The sample screen 50 may be formatted by the processor 18 and displayed on the user interface 24. The sample screen 50 may also be displayed on the user interfaces 32, 34, 36 of the computing devices 26, 28, 30. In some embodiments, processors of the computing devices 26, 28, 30 may at least partly configure and/or format the sample screen 50 that is displayed on the corresponding user interfaces 32, 34, 36. In one example, the sample screen 50 may use a grid 52 for each month (e.g., January, February, March, etc.) to display the status of the industrial equipment 12 during each hour of each day for the month. The grid 52 may include a heading 54 that indicates the month to the user. The sample screen 50 may include a selected field 55 that describes content selected by the user. For example, the selected field 55 may provide a total amount of time selected by the user. The selected field 55 may also provide a range of the dates and times selected by the user. The sample screen 50 may include an ability to scroll through the grids 52, such that grids 52 of months that may not be visible may be viewed. For example, when the user selects the previous button 56, the sample screen 50 may scroll and enable the user to view months prior to January, in descending order. In particular, when the user selects the previous button 56, the sample screen 50 may display a grid 52 of the status of the industrial equipment 12 for December of the preceding year. Similarly, when the user selects the next button 58, the sample screen 50 may scroll and enable the user to view months including and following March, in ascending order. In particular, when the user selects the next button 58, the sample screen 50 may display a grid 52 of the status of the industrial equipment 12 for March and April. The grid 52 may include columns 60 representing each day (e.g., 01, 02, 03, etc.) of the month. The grid may include rows 62 representing each hour (e.g., 00:00, 01:00, 02:00, etc.) of the day.

Each cell (e.g., 64) of the grid 52 may, in some embodiments, represent a date and time. For example, cell 64 may represent January $8^{th}$ at 12 noon. The cell may have a certain appearance depending on the status of the industrial equipment 12 that the cell is representing. For example, the cell 64 may represent a status indicating that the industrial equipment 12 is operating as programmed or desired. As illustrated, the cell 64 is blank or colored white and unshaded. In some embodiments, the cell 66 may represent a status indicating that the industrial equipment 12 is not operating as desired, and the reason that the industrial equipment 12 is not operating as desired is known or accounted for (e.g., the industrial equipment 12 is undergoing scheduled maintenance). The cell 66 may be shaded or include a first distinguishing visual pattern (e.g., degrees of shading, striping, cross-hatching, etc.). In a similar matter, the cell 68 may represent a status indicating that the industrial equipment 12 is not operating as desired, and the reason that the industrial equipment 12 is not operating as desired is unknown or unaccounted for. The cell 68 may be colored or include a second distinguishing visual pattern. In some embodiments, additional or alternative statuses of the industrial equipment 12 may be displayed. For example, some embodiments may include statuses corresponding to specific reasons that the industrial equipment 12 is not operating as desired, such as planned or unplanned downtimes or a degree of performance of the industrial equipment 12. In some embodiments, the statuses of the industrial equipment 12 may correspond to visual indicators of the cell that use additional or alternative colors or visual forms of identification.

The status may be based at least in part on the measurement of the operating characteristic of the industrial equipment 12 sent to the computing device 16 from the sensor 14. For example, the status may be based at least in part on the speed of the industrial equipment 12, e.g., a gas turbine. If the speed of the gas turbine is equal to or above a threshold speed (e.g., 300 revolutions per minute (RPM)), then the processor 18 of the computing device 16 may determine that the status of the gas turbine is operating as desired. If the speed of the gas turbine is less than the threshold speed (e.g., 300 RPM), then the processor 18 of the computing device 16 may determine that the status of the gas turbine is not operating as desired. The measurement sent from the sensor 14 may be initiated by a controller of the industrial equipment 12 or of the sensor 14. The controller may synchronously send the measurement to the computing device 16 at regular intervals (e.g., every hour). Additionally or alternatively, the controller may asynchronously send the measurement when a predetermined threshold has been reached. For example, if the speed of the gas turbine is drops below 300 RPM, then the controller may send the speed of the gas turbine to the computing device 16. In some embodiments, the controller may send the measurement when a change in the measurement is greater than the same threshold. For example, if the change in the speed of the gas turbine from a previous measurement is greater than 25%, the controller may send the measurement to the computing device 16. In some embodiments, the processor 18 of the computing device 16 may request synchronous or asynchronous measurements from the sensor 14.

The status of the industrial equipment 12 may also be based at least in part on user input or other information, such as a schedule of the industrial equipment 12. For example, if the processor 18 determines that the status of the gas turbine is not operating as desired, and the user provides information that during the time the gas turbine is determined not to be operating as desired the gas turbine was undergoing maintenance, then the processor 18 of the computing device 16 may determine that the reason the gas turbine is not operating as desired was planned (e.g., "Planned") or for maintenance issues (e.g., "Maintenance"). Similarly, if the processor 18 determines that the status of the gas turbine is not operating as desired, and the schedule of the industrial equipment 12 provides that during the time the gas turbine is determined not to be operating as desired the gas turbine was undergoing maintenance, then the processor 18 of the computing device 16 may determine that the status of the gas turbine is not operating as desired and was planned (e.g., "Planned") or is not operating as desired and was for maintenance issues (e.g., "Maintenance"). The schedule of the industrial equipment 12 may be stored in the memory 22 of the computing device 16 and accessed by the processor 18. In some embodiments, scheduling software that indicates a schedule of the industrial equipment 12 may be part of the industrial equipment 12 and may be sent to the computing device 16 via the communication interface 20.

The cells of the grid 52 may be updated based on information provided by the sensor 14 coupled to the industrial equipment 12. For example, the communication interface 20 may receive the information from the sensor 15 via physical or wireless communication. The processor 18 may store the information provided by the sensor 14 in the memory 22 of the computing device 16, and/or use the information to update one or more cells of the grid 52. In particular, the processor 18 may use the information provided by the sensor 14 to determine the status of the industrial equipment 12 for a date and time, and update an appearance and user interaction of the cell based at least in part on the information provided by the sensor 14.

The grid 52 may include one or more summaries of the status of the industrial equipment 12. The one or more summaries may include a total amount of time or a percentage of a time for a specific status of the industrial equipment 12. For example, the grid 52 may include a total amount of time unaccounted 70 for the month, where the total amount of time unaccounted 70 corresponds to a total time for the month that the industrial equipment 12 was not operating as desired, and the reason that the industrial equipment 12 was not operating as desired is unknown or unaccounted for. In some embodiments, the grid 52 may include a percentage uptime 72 (i.e., a percentage of a time that the status of the industrial equipment 12 was operating as desired) for the month.

The sample screen 50 may be reproduced on multiple user interfaces for multiple users. The sample screen 50 may be shared via a communication network (e.g., WiFi, Internet, etc.). For example, the sample screen 50 may be presented on user interface 24 of the computing device 16, as well as user interfaces 32, 34, 36 of the computing devices 26, 28, 30. When the cells of the grids 52 are updated, the sample screens 50 presented on the multiple user interfaces may be updated accordingly. As a result, embodiments of the present disclosure may achieve near-real time monitoring and reporting. Although the foregoing description of FIG. 2 has been described with the cells being related to hours, days, and months, it should be noted that the sample screen 50 and the grid 52 may be organized according to a variety of time increments. For example, the sample screen 50 and the grid 52 may be organized by minute, five minute, ten minute, fifteen minute, half hour, or half day increments.

Figure 3:
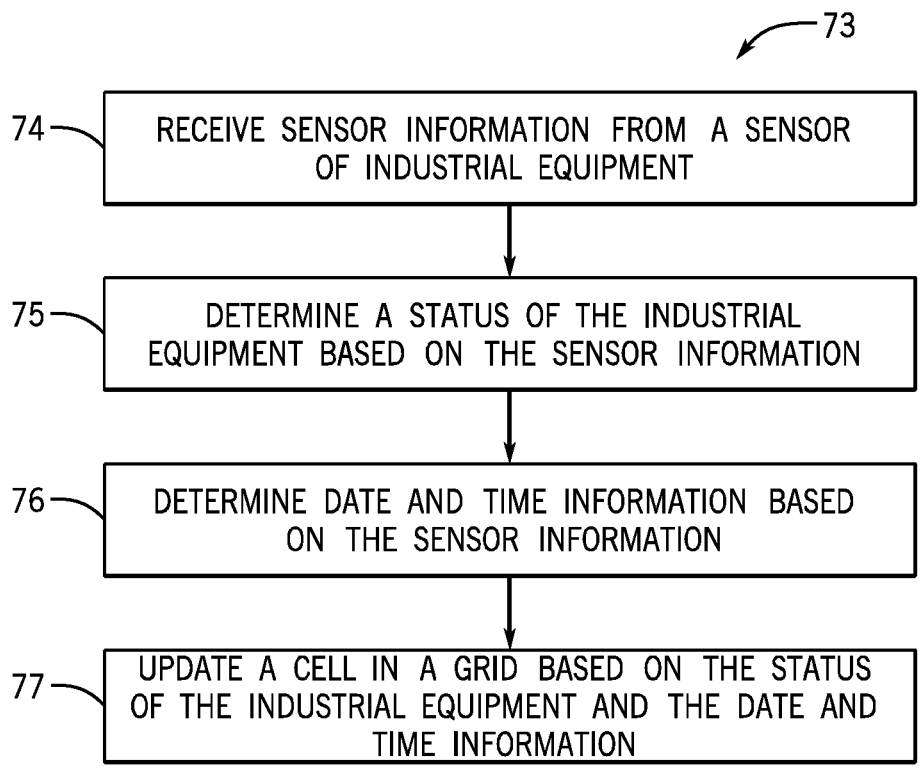
FIG. 3 is a flowchart illustrating a method for monitoring and reporting a status of the industrial equipment in accordance with an embodiment.

Turning now to FIG. 3, a flowchart of a method 73 for monitoring and reporting the status of the industrial equipment 12 in accordance with an embodiment is illustrated. The method 73 may be performed by the processor 18 of the computing device 16 coupled to the sensor 14 of the industrial equipment 12. The processor 18 of the computing device 16 first receives (block 74) sensor information from the sensor 14 coupled the industrial equipment 12. The sensor 14 may include one or more sensors 14 coupled to the industrial equipment 12. The sensor 14 may measure one or more operating characteristics of the industrial equipment 12. For example, the sensor 14 may measure a speed, a temperature, a pressure, a composition, a mode of operation, and/or the like of the industrial equipment 12. The information received from the sensor 14 may include or be based at least in part on the measurement of the operating characteristic of the industrial equipment 12.

The processor 18 then determines (block 75) a status of the industrial equipment 12 based on the sensor information received from the sensor 14. The status may be based at least in part on the measurement of the operating characteristic of the industrial equipment 12 sent to the computing device 16 from the sensor 14. For example, the status may be based at least in part on the speed of the industrial equipment 12, e.g., a gas turbine. If the speed of the gas turbine is equal to or above a threshold speed (e.g., 300 revolutions per minute (RPM)), then the processor 18 of the computing device 16 may determine that the status of the gas turbine is operating as desired. If the speed of the gas turbine is less than the threshold speed (e.g., 300 RPM), then the processor 18 of the computing device 16 may determine that the status of the gas turbine is not operating as desired. The status of the industrial equipment 12 may also be based at least in part on user input or other information, such as a schedule of the industrial equipment 12. For example, if the processor 18 determines that the gas turbine is not operating as desired, and the user provides information that, during the time the gas turbine is determined not to be operating as desired, the gas turbine was undergoing maintenance, then the processor 18 of the computing device 16 may determine that the status of the gas turbine is not operating as desired for maintenance issues (e.g., "Maintenance). Similarly, if the processor 18 determines that the gas turbine is not operating as desired, and the schedule of the industrial equipment 12 provides that, during the time the gas turbine is determined not to be operating as desired, the gas turbine was undergoing maintenance, then the processor 18 of the computing device 16 may determine that the status of the gas turbine is not operating as desired for maintenance issues (e.g., "Maintenance).

The processor 18 also determines (block 76) date and time information based on the sensor information. The processor 18 may determine the date and time information corresponding to when the sensor information was received. For example, the processor 18 may determine the date and time information using a clock function of the processor 18. In some embodiments, the date and time information may be included in the sensor information received from the sensor 14.

The processor 18 may update (block 77) a cell in a grid 52 based on the status of the industrial equipment 12 and the date and time information. For example, the processor 18 may update the cell in the grid 52 by updating a visual appearance of the cell and/or by providing information to be displayed that may be associated with the cell, as illustrated in FIG. 2.

Figure 4:
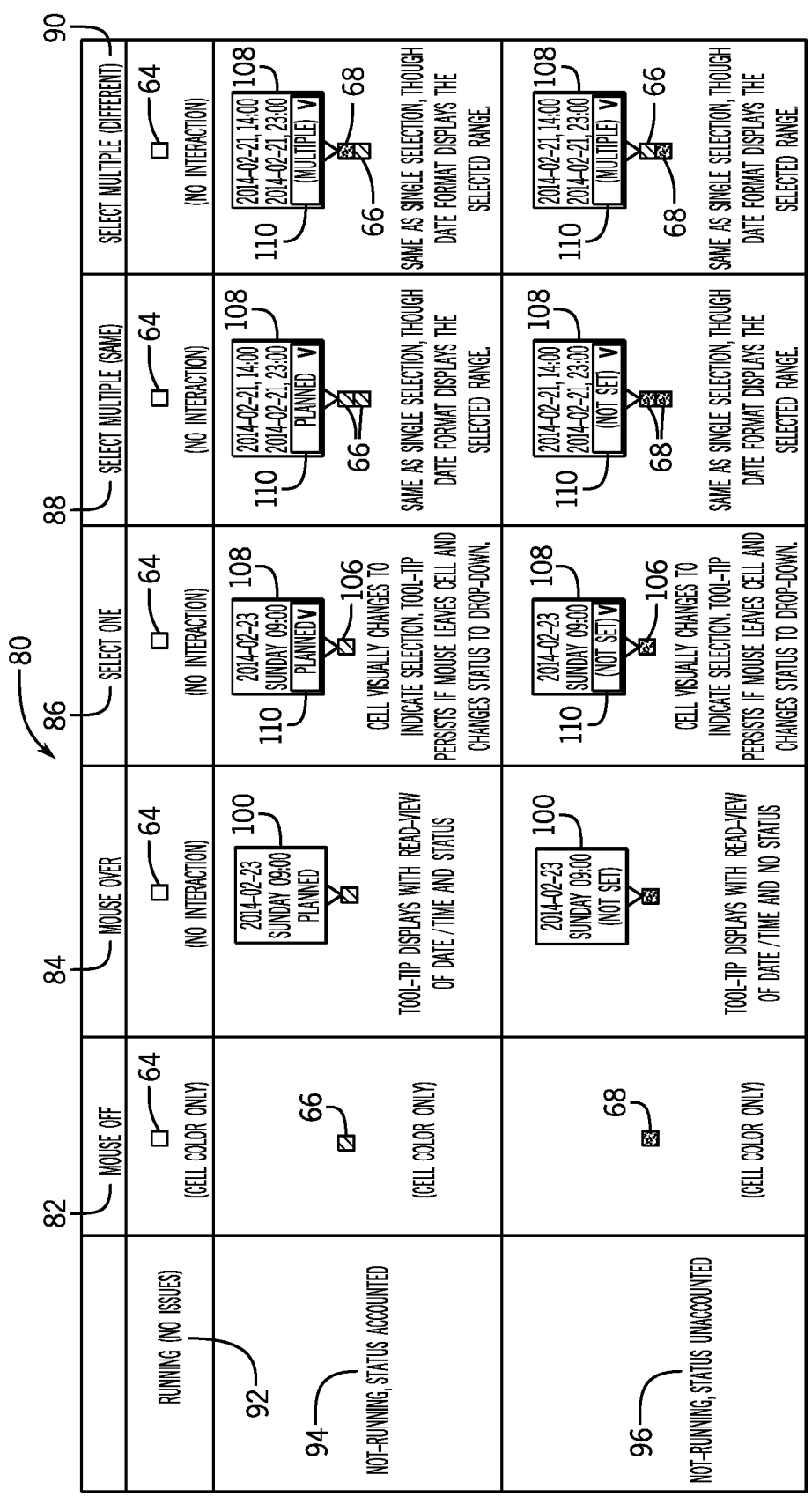
FIG. 4 is a table illustrating possible user interactions with cells of a grid used to monitor and report a status of industrial equipment in accordance with an embodiment of the present disclosure.

In addition to the visual appearances for cells depicted in FIG. 2, FIG. 4 includes a table 80 that illustrates possible user interactions with the cells of the grid 52 used to monitor and report the status of the industrial equipment 12 in accordance with an embodiment of the present disclosure. The table 80 describes how a cell 64 of the grid 52 may represent different statuses of the industrial equipment 12 and convey information to a user when the user interacts with the cells using an input device (e.g., a mouse device). The table 80 includes columns corresponding to the user interaction. In particular, a "Mouse Off" column 82 may correspond to when a mouse pointer is not positioned on the cell. A "Mouse Over" 84 column may correspond to when the mouse pointer is positioned on the cell. A "Select One" 86 column may correspond to when the user has selected (e.g., clicked on, highlighted) one cell. A "Select Multiple (same)" 88 column may correspond to when the user has selected multiple cells that have the same status. A "Select Multiple (different)" 90 column may correspond to when the user has selected multiple cells that have different statuses. In some embodiments, additional or other user interactions may be added by performing certain actions with an input device (e.g., left-clicking on the mouse, right-clicking on the mouse, double-clicking on the mouse, etc.).

The table 80 includes rows corresponding to the statuses of the industrial equipment 12. A "running (no issues)" row 92 may correspond to the status indicating that the industrial equipment 12 is operating as desired. A "not-running, status accounted" row 94 may correspond to the status indicating that the industrial equipment 12 is not operating as desired, and the reason that the industrial equipment 12 is not operating as desired is known or accounted for. A "not-running, status unaccounted" 96 may correspond to the status indicating that the industrial equipment 12 is not operating as desired, and the reason that the industrial equipment 12 is not operating as desired is unknown or unaccounted for. In some embodiments, additional or other statuses of the industrial equipment 12 may be displayed (e.g., statuses corresponding to specific reasons that the industrial equipment 12 is not operating as desired, statuses corresponding to a degree of performance of the industrial equipment 12, etc.).

When a cell of the grid 52 has the status indicating that the industrial equipment 12 is operating as desired (as indicated by the "running (no issues)" row 92), the cell (e.g., cell 64) may have a first appearance (e.g., unshaded, colored white, etc.). As depicted the table 80, the cell 64 may have the first appearance when the user does or does not have the mouse pointer positioned on the cell 64. The cell 64 also may have the first appearance when the user selects the cell 64, when the user selects multiple cells 64, and when the user selects multiple cells that both include the cell 64 and cells that do not include the cell 64 (i.e., cells that correspond to a status other than indicating that the industrial equipment 12 is operating as desired). In some embodiments, the visual appearance or color of the cells may use additional or other colors or other visual forms of identification (e.g., shading, striping, cross-hatching, etc.).

In this example, it may not be desirable for the cell 64 that has the status of the industrial equipment 12 operating as desired to change appearance or provide additional information when the user interacts with the cell 64 because the cell 64 already provides sufficient information. As such, in some embodiments, the processor 18 may generate a dialog box (e.g., a "tool-tip") indicating the date and time information (e.g., in date and time fields) and the status of the industrial equipment 12 (e.g., "running (no issues)" in a status field) corresponding to the cell 64 based on user interaction with the cell 64 (e.g., positioning the mouse pointer over the cell 64, selecting the cell 64, etc.). The dialog box may include a drop-down menu that displays the status and enables the user to change the status to a different status. The dialog box may be provided in a read-only (i.e., such that the user may not be able to change information in the dialog box) or a read-write mode (i.e., such that the user may be able to change the information in the dialog box). For example, the dialog box may look and act similarly or identically to dialog boxes 100 as discussed in more detail below. The dialog boxes 100 may also share the aspects of the dialog box discussed above.

When the cell of the grid 52 has the status indicating that the industrial equipment 12 is not operating as desired, and the reason that the industrial equipment 12 is not operating as desired is known and accounted for (as indicated by the "not-running, status accounted" row 94), the cell (e.g., cell 66) may have a second appearance (e.g., shaded, partially shaded, striped, colored gray, etc.). The cell 66 may have the second appearance when the user does not have the mouse pointer positioned on the cell 66. When the user has the mouse pointer positioned over the cell 66, the processor 18 may generate a dialog box 100 indicating the date and time information and the status of the industrial equipment 12 (e.g., "Planned") corresponding to the cell 66. When the user selects the cell 66, the processor 18 may visually change the cell 66 to indicate that the user selected the cell 66. For example, the processor 18 may outline the cell 66 using a dashed pattern 106. The processor 18 may also generate a dialog box 108 indicating the date and time information corresponding to the cell 66 and a drop-down menu 110 that displays the status of the industrial equipment 12 (e.g., "Planned") corresponding to the cell 66. The drop-down menu 110 may persist if the mouse pointer leaves the cell 66 and selects the drop-down menu 110. The user may be able to change the status of the industrial equipment 12 by selecting the drop-down menu 110 and selecting a different status of the industrial equipment 12 (e.g., "Unplanned").

When a cell of the grid 52 has the status indicating that the industrial equipment 12 is not operating as desired, and the reason that the industrial equipment 12 is not operating as desired is unknown or unaccounted for (as indicated by the "not-running, status accounted" row 96), the cell (e.g., cell 68) may have a third appearance (e.g., shaded, cross-hatched, colored black, etc.). The cell 68 may have the third appearance when the user does not have the mouse pointer positioned on the cell 68. When the user has the mouse pointer positioned over the cell 68, the processor 18 may generate a dialog box 100 indicating the date and time information and the status of the industrial equipment 12 (e.g., "not set") corresponding to the cell 66. When the user selects the cell 68, the processor 18 may visually change the cell 68 to indicate that the user selected the single cell 68. The processor 18 may also generate a dialog box 108 indicating the date and time information corresponding to the cell 68 and a drop-down menu 110 that displays the status of the industrial equipment 12 (e.g., "Planned") corresponding to the cell 68.

In some embodiments, the user may select multiple cells (e.g., cells 66) of the grid 52 that share the same status (e.g., as shown in column 88). In some embodiments, the processor 18 may visually change the multiple selected cells 66 to indicate that the user selected the multiple cells 66. Additionally, the processor 18 may generate a dialog box 108 indicating the date and time information corresponding to the multiple cells selected 66 and a drop-down menu 110 that displays the status of the industrial equipment 12 (e.g., "Planned") corresponding to the multiple cells selected 66.

In some embodiments, the user may select different sets of multiple cells (e.g., 66, 68) that have at least two different statuses (e.g., as shown in column 90). In some embodiments, the processor 18 may visually change the multiple cells selected 66, 68 to indicate that the user selected the multiple cells 66, 68. Additionally, the processor 18 may generate a dialog box 108 indicating the date and time information corresponding to the multiple cells selected 66, 68 and a drop-down menu 110 that indicates that at least two different statuses of the industrial equipment 12 are included in the multiple cells selected 66, 68 (e.g., "(multiple)").

The user may change the status of a cell of the grid 52 by using the drop-down menu 110 of the dialog box 108, thus enabling the user to change the status of the industrial equipment 12. As a result, the status of the industrial equipment 12 may be reported more accurately. For example, if the user positions the mouse pointer over the cell 68, as illustrated in table 80, the dialog box 100 indicates that the status of the industrial equipment 12 was not operating as desired at the time represented by the cell 68, and the reason that the industrial equipment 12 is not operating as desired was unknown or unaccounted for. The user may determine that the industrial equipment 12 was not operating as desired because it was turned off for maintenance reasons. The user may change the status of the industrial equipment 12 by selecting the cell 68, selecting the drop-down menu 110 as illustrated in table 80, and selecting a status related to maintenance reasons (e.g., "Maintenance"). In another example, the user may determine that the industrial equipment 12 was not operating as desired because of a power outage or other unplanned event. The user may change the status of the industrial equipment 12 by selecting the cell 68, selecting the drop-down menu 110 as illustrated in table 80, and selecting a status related to power outages or unplanned events (e.g., "Power Outage," "Unplanned," etc.). As such, as more information regarding the interruption is known, the corresponding cells of the grid 52 may be updated.

In some embodiments, the user may control the industrial equipment 12 by changing the status of a cell of the grid 52. The processor 18 of the computing device 16 may, for example, send one or more instructions to a controller of the industrial equipment 12, via the communication interface 20. As such, changing the status of the cell may result in the processor 18 sending one or more instructions to the controller of the industrial equipment 12. In particular, the user may select a cell having the current or future date and time information and select a status from a drop-down menu of a dialog box. At the current or future date and time, the processor 18 may send one or more instructions to the controller of the industrial equipment 12 based on the status selected by the user. For example, the user may select the "Maintenance" status, indicating that the industrial equipment 12 will not be operating due to maintenance reasons. The selection of the "Maintenance" status may be communicated to the computing device 16 via the communication interface 20 from the user interface 24 of the computing device 16, or the user interfaces 32, 34, 36 of the computing devices 26, 28, 30 that are coupled to the computing device 16. The processor 18 of the computing device 16 may, as a result, send an instruction to the controller of the industrial equipment 12, via the communication interface 20, to stop executing instructions and/or go offline at the proposed time. Additionally or alternatively, the processor 18 may, on a future date and time, send the instruction to the controller of the industrial equipment 12 to stop executing instructions and/or go offline.

In some embodiments, multiple users may be able to update and report statuses of the industrial equipment 12. The sample screen 50 may be reproduced on multiple user interfaces for multiple users. The sample screen 50 may be shared via a communication network (e.g., WiFi, Internet, etc.). For example, the sample screen 50 may be presented on user interface 24 of the computing device 16, as well as user interfaces 32, 34, 36 of the computing devices 26, 28, 30. When the cells of the grids 52 are updated and/or the status of the industrial equipment 12 is changed, the sample screens 50 presented on the multiple user interfaces may be updated accordingly. As a result, embodiments of the present disclosure may achieve real-time or near-real time monitoring and reporting.

Figure 5:
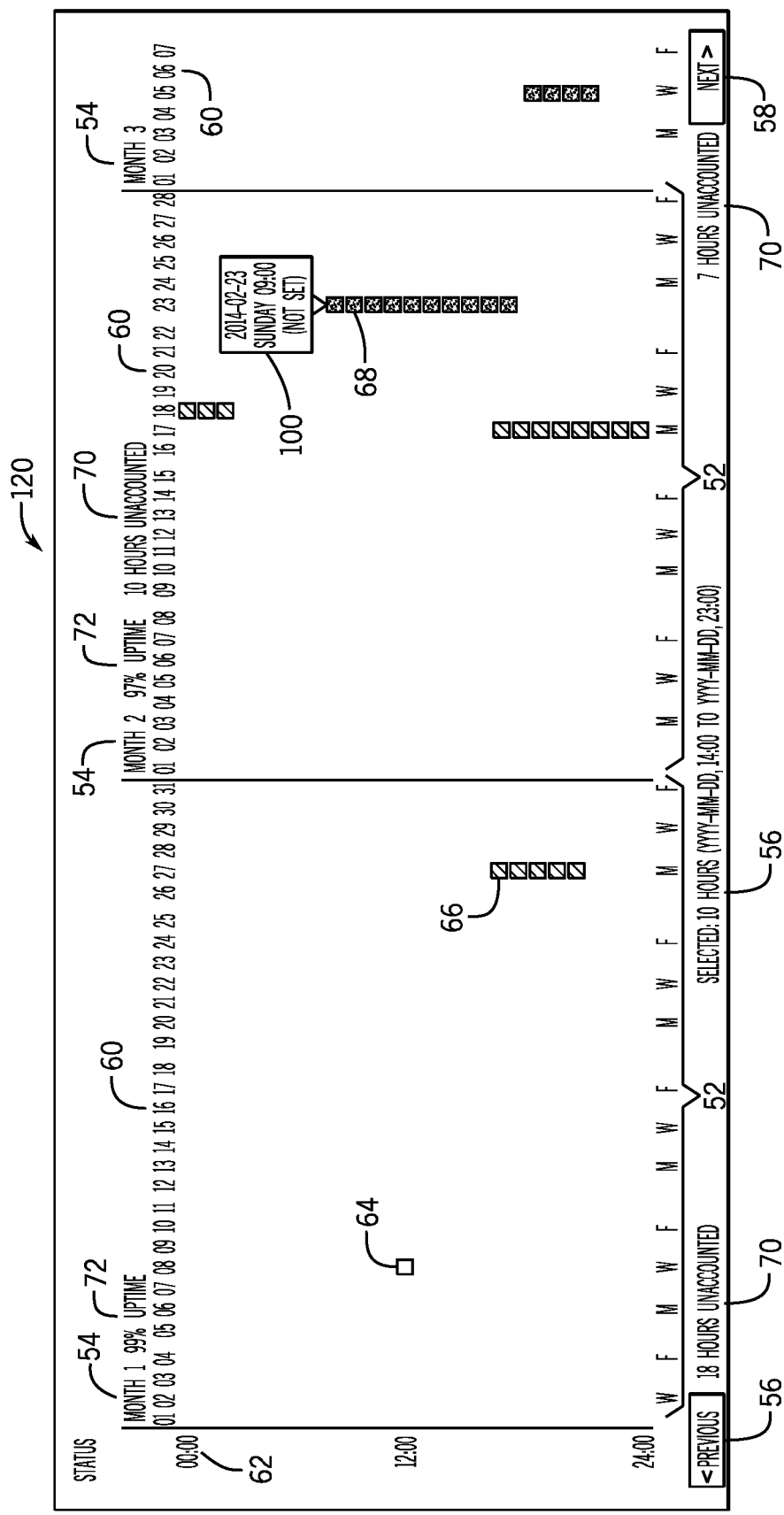
FIG. 5 is a sample screen of a system for monitoring and reporting a status of industrial equipment in accordance with an embodiment of the present disclosure.

With the foregoing in mind, FIG. 5 is a sample screen 120 of the system 10 for monitoring and reporting the status of the industrial equipment 12 in accordance with an embodiment of the present disclosure. The sample screen 160 of FIG. 5 is similar to sample screen 50 of FIG. 2, showing a user interacting with the cell 68 and the reaction and information displayed by a corresponding dialog box 100 as a reaction of the user interaction. In this example, the user has positioned an indicator of an input device (e.g., a mouse pointer of a mouse device) over the cell 68. Based on the location of the cell 68 on the grid 52, the cell 68 represents the status of the industrial equipment 12 on a date of February $23^{rd}$ and a time of 9 AM. Because the cell 68 is colored black, the cell 68 represents that the status is not operating as desired, and the reason that the industrial equipment 12 is not operating as desired is unknown or unaccounted for (e.g., "(not set)"). In addition, because the user has positioned the mouse pointer over the cell 68, the processor 18 generates the dialog box 100 that indicates the date and time information and the status of the industrial equipment 12 (e.g., "(not set)") corresponding to the cell 68.

Technical effects include systems and methods for populating a software grid with entries that include a status of the industrial equipment for each hour of operation. The grid may be configured to enable a user and/or software to change the status of the industrial equipment by accessing one or more entries of the grid. When shared among multiple users, embodiments of the present disclosure may achieve near-real time monitoring and reporting. Integrating the grid with user interaction and additional software may achieve an even higher degree of accuracy. In some embodiments, a reporting function may be used to generate reports based on one or more selected entries. In additional or alternative embodiments, a user may control the industrial equipment by changing the status of the industrial equipment of a current or future date and time by selecting and changing one or more entries in the grid.

This written description uses examples to disclose embodiments, including the best mode, and also to enable any person skilled in the art to practice the embodiments, including making and using any devices or systems and performing any incorporated methods. The patentable scope of the embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system comprising:
one or more sensors coupled to industrial equipment, wherein the one or more sensors are configured to obtain one or more measurements associated with one or more operating characteristics of the industrial equipment; and
a computing device comprising:
a user interface; and
one or more processors configured to:
receive the one or more measurements of the one or more operating characteristics of the industrial equipment from the one or more sensors;
in response to the receiving the one or more measurements from the one or more sensors, determine a status of the industrial equipment based on the one or more measurements;
determine a date and a time associated with the status based on the one or more measurements;
update a first status field of a first cell in a grid of cells organized according to time increments based on the status, the update of the first status field causing a first visual pattern associated with the status to be displayed within the first cell, wherein each cell of the grid of cells comprises a status field, a date field, and a time field, a first date field of the first cell is associated with the date, and a first time field of the first cell is associated with the time;
receive a user-selected status of the industrial equipment from a user via the user interface, the user-selected status associated with a user-selected time and a user-selected date;
control operation of the industrial equipment in accordance with the user-selected status at the user-selected time and the user-selected date; and
update a second status field of a second cell in the grid of cells according to the user-selected status, the update of the second status field causing a second visual pattern associated with the user-selected status to be displayed within the second cell, wherein a second date field of the second cell is associated with the user-selected date, and a second time field of the second cell is associated with the user-selected time.

2. The system of claim 1, wherein the industrial equipment comprises a gas turbine, a wind turbine, a gas engine, a diesel engine, a reciprocating engine, or a compressor.

3. The system of claim 1, wherein the one or more sensors comprise an accelerometer, a proximity sensor, a tachometer, a temperature gauge, and/or a pressure gauge.

4. The system of claim 1, wherein the one or more operating characteristics of the industrial equipment comprise a speed, a vibration, a temperature, a pressure, a composition, and/or a mode of operation.

5. The system of claim 1, wherein the first visual pattern and the second visual pattern are included in a plurality of visual patterns stored in a memory of the computing device, the plurality of visual patterns including a blank pattern, a striped pattern, a cross-hatched pattern, or a color.

6. The system of claim 1, wherein the computing device is wirelessly coupled to the one or more sensors.

7. The system of claim 1, wherein the status of the industrial equipment comprises a running status, a not running for planned reasons status, and a not running for unplanned reasons status.

8. A method comprising:
receiving, by one or more processors of a computing device, one or more measurements associated with one or more operational characteristics of industrial equipment from one or more sensors coupled to the industrial equipment;
in response to receiving the one or more measurements from the one or more sensors, determining, by the one or more processors, a status of the industrial equipment based on the one or more measurements;
determining, by the one or more processors, a date and time associated with the status based on the one or more measurements;
updating, by the one or more processors, a first status field of a first cell in a grid of cells organized according to time increments based on the status, the updating of the first status field causing a first visual pattern associated with the status to be displayed within the first cell, wherein each cell of the grid of cells comprises a status field, a date field, and a time field, a first date field of the first cell is associated with the date, and a first time field of the first cell is associated with the time;
receiving, by the one or more processors, a user-selected status of the industrial equipment from a user via a user interface of the computing device, the user-selected status associated with a user-selected time and a user-selected date;
controlling, by the one or more processors, operation of the industrial equipment in accordance with the user-selected status at the user-selected time and the user-selected date; and
updating, by the one or more processors, a second status field of a second cell in the grid of cells according to the user-selected status, the updating of the second status field causing a second visual pattern associated with the user-selected status to be displayed within the second cell, wherein a second date field of the second cell is associated with the user-selected date, and a second time field of the second cell is associated with the user-selected time.

9. The method of claim 8, wherein the industrial equipment comprises a gas turbine, a wind turbine, a gas engine, a diesel engine, a reciprocating engine, or a compressor.

10. The method of claim 8, wherein the one or more sensors comprise an accelerometer, a proximity sensor, a tachometer, a temperature gauge, and/or a pressure gauge.

11. The method of claim 8, wherein the grid of cells corresponds to a month of a year.

12. The method of claim 8, wherein the grid comprises columns representing days and rows representing hours.

13. The method of claim 8, wherein the first visual pattern and the second visual pattern are included in a plurality of visual patterns stored in a memory of the computing device, the plurality of visual patterns including a blank pattern, a striped pattern, a cross-hatched pattern, or a color.

14. The method of claim 8, wherein receiving the one or more measurements includes synchronously requesting, by the one or more processors, the one or more measurements from the one or more sensors.

15. The method of claim 8, wherein receiving the one or more measurements includes the one or more sensors synchronously or asynchronously initiating sending the one or more measurements to the computing device.

16. A tangible, non-transitory, machine-readable-medium, comprising machine-readable instructions to:
receive one or more measurements associated with one or more operating characteristics of industrial equipment from one or more sensors coupled to the industrial equipment;
in response to receiving the one or more measurements, determine a status of the industrial equipment based on the one or more measurements;
determine a date and time associated with the status;
update a first status field of a first cell in a grid of cells organized according to time increments based on the status, the updating of the first status field causing a first visual pattern associated with the status to be displayed within the first cell, wherein each cell of the grid of cells comprises a status field, a date field, and a time field, a first date field of the first cell is associated with the date and a first time field of the first cell is associated with the time;
receive a user-selected status of the industrial equipment from a user via a user interface of the computing device, the user-selected status associated with a user-selected time and a user-selected date;
control operation of the industrial equipment in accordance with the user-selected status at the user-selected time and the user-selected date; and
update a second status field of a second cell in the grid of cells according to the user-selected status, the updating of the second status field causing a second visual pattern associated with the user-selected status to be displayed within the second cell, wherein a second date field of the second cell is associated with the user-selected date, and a second time field of the second cell is associated with the user-selected time.

17. The tangible, non-transitory, machine-readable-medium of claim 16, comprising machine-readable instructions, wherein the first status field comprises text for the status of the industrial equipment, wherein the second status field comprises a drop-down menu for the user-selected status of the industrial equipment.

18. The tangible, non-transitory, machine-readable-medium of claim 16, comprising machine-readable instructions, wherein the first status field comprises a drop-down menu, wherein the drop-down menu enables a user to change the status of the industrial equipment.

19. The tangible, non-transitory, machine-readable-medium of claim 16, the first visual pattern and the second visual pattern are included in a plurality of visual patterns stored in a memory of the computing device, the plurality of visual patterns including a blank pattern, a striped pattern, a cross-hatched pattern, or a color.

20. The tangible, non-transitory, machine-readable-medium of claim 16, comprising machine-readable instructions, wherein the status of the industrial equipment comprises a running status, a not running for planned reasons status, and a not running for unplanned reasons status.

* * * * *